US009933531B2

(12) United States Patent
Tuch et al.

(10) Patent No.: US 9,933,531 B2
(45) Date of Patent: Apr. 3, 2018

(54) METHOD AND APPARATUS FOR IMAGING OF LOW RADIANCE OBJECTS

(71) Applicant: LIGHTPOINT MEDICAL LIMITED, Chesham (GB)

(72) Inventors: David Tuch, Hertfordshire (GB); Kunal Vyas, Cambridgeshire (GB); Alan Green, Cambridgeshire (GB)

(73) Assignee: LIGHTPOINT MEDICAL LIMITED, Hertfordshire (GB)

( * ) Notice: Subject to any disclaimer, the term of this patent is extended or adjusted under 35 U.S.C. 154(b) by 243 days.

(21) Appl. No.: 14/745,109

(22) Filed: Jun. 19, 2015

(65) Prior Publication Data
US 2015/0373309 A1 Dec. 24, 2015

(30) Foreign Application Priority Data

Jun. 20, 2014 (GB) .................................... 1411016.7

(51) Int. Cl.
*G01T 1/22* (2006.01)
*G02B 7/08* (2006.01)
*G02B 7/10* (2006.01)

(52) U.S. Cl.
CPC .................. *G01T 1/22* (2013.01); *G02B 7/08* (2013.01); *G02B 7/102* (2013.01)

(58) Field of Classification Search
CPC ............... G01T 1/22; G02B 7/08; G02B 7/102
See application file for complete search history.

(56) References Cited

U.S. PATENT DOCUMENTS

2008/0218611 A1* 9/2008 Parulski ............... H04N 5/2258
348/262
2009/0103792 A1* 4/2009 Rahn .................. G01N 21/4795
382/131

FOREIGN PATENT DOCUMENTS

| CN | 101551346 | 10/2009 |
| EP | 1 632 770 | 3/2006 |
| WO | WO-2014/020360 | 2/2014 |
| WO | WO-2014/093980 | 6/2014 |

OTHER PUBLICATIONS

Search Report for UK Patent Application No. GB1411016.7, dated Dec. 18, 2014, 1 page.

* cited by examiner

*Primary Examiner* — Francis M Legasse, Jr.
(74) *Attorney, Agent, or Firm* — Foley & Lardner LLP; Mark J. Danielson

(57) ABSTRACT

An apparatus for optical imaging of a low radiance object is disclosed. The apparatus comprises a fixed polychromatic imaging device, the optical path between the polychromatic imaging device and the low radiance object being defined by a first section extending from the polychromatic imaging device to a fixed point, and a second section extending from the fixed point to the low radiance object. The apparatus also comprises a fixed high-sensitivity imaging device, the optical path between the high-sensitivity imaging device and the low radiance object being defined by a third section extending from the high-sensitivity imaging device to the fixed point, and the second section; and a focus controller arranged to control the focus of the high-sensitivity imaging device based on the focus of the polychromatic imaging device and the respective lengths of the first and third sections.

21 Claims, 4 Drawing Sheets

METHOD AND APPARATUS FOR IMAGING OF LOW RADIANCE OBJECTS

CROSS-REFERENCE TO RELATED APPLICATIONS

The present application claims priority to UK Application Number 1411016.7, filed Jun. 20, 2014, the contents of which are incorporated by reference herein in their entirety.

TECHNICAL FIELD

The present application relates to the field of imaging. In particular, the present invention relates to a method and apparatus for optical imaging of low radiance objects.

BACKGROUND TO THE INVENTION AND PRIOR ART

Optical imaging of objects emitting very low light levels, for example <106 photons/s/cm2, has applications ranging from scientific research to medical imaging. Biological objects of interest include fluorescently stained biological targets, phosphorescing objects, light passing through human tissue, surgical samples, in vitro experiments, and in vivo experiments.

One source of light of particular interest is the light emitted from charged particles passing through dielectric materials at a speed greater than the phase velocity of light in that material. This phenomenon is commonly known as Cerenkov luminescence. Radiopharmaceuticals which emit energetic alpha and beta particles can be a source of these Cerenkov photons. Radiopharmaceuticals can also be designed to accumulate at the site of a wide range of diseases. Therefore, the ability to quickly and accurately image Cerenkov luminescence has wide ranging application in the diagnosis and treatment of a variety of diseases.

In order to achieve this, high sensitivity cameras can be used to image the very weak light emitted from Cerenkov luminescence. Such cameras may be based around an electron multiplying charge-coupled device (emCCD), an intensified CCD, a photon multiplier tube (PMT) array or microchannel plates with electron collection by one or more electrodes. Typically, the object to be imaged and the highly sensitive camera are enclosed in a substantially light-tight enclosure. An image of the object can then be reconstructed from the signal average over tens of seconds up to tens of hours of exposure, depending on the luminosity of the object.

Optionally, these same high sensitivity cameras may also take high resolution photographic (white light) images of an object with the aid of a conventional light source to illuminate the object. The two images may then be digitally superimposed onto each other to aid interpretation of the images. Many commercially available cameras sufficiently sensitive to image low luminosity samples are also capable of taking such polychromatic images. However, there is a significant delay experienced when switching between imaging modes, to allow for the necessary cooling and dissipation of charge needed for high sensitivity imaging. This can be difficult to achieve in clinical/surgical environments. Additionally, a lens which is optimal for high-sensitivity imaging may not be suitable for white-light imaging and vice versa.

In order to overcome these issues, it is possible to introduce a second, high resolution, camera into the optical system. Doing so however introduces several technical challenges into the design of the optical path, as discussed in related patent application publication number WO2014020360.

For example, because the time required to capture an image of a given signal to noise ratio is proportional to the inverse of the photon intensity squared, in order to capture an image of a low luminosity sample in a reasonable/quick/useable time frame, it is imperative to capture as many of the emitted photons as possible. The above-described imaging systems have a number of problems to overcome to achieve this.

Two related parameters which affect the proportion of photons received at the imaging chip must be optimised. Firstly, the larger the lens aperture, the greater the amount of collected incident light. The amount of light collected rises proportionally with an increase in the diameter of the aperture squared. Ideally a large aperture lens (f/#<1, where f/#=(2 sin($\varphi$))−1, and $\varphi$ is the cone half-angle at the image) is therefore required. Secondly, it is desirable to adjust the optical system so that the region of interest of the sample fills as much of the field of view of the lens/camera as possible, in order to ensure that the imaging chip is fully utilised.

One problem with the above parameters is that as the aperture size of a lens increases, the depth of field of the resultant image reduces proportionally. In a system with a very large depth of field, for example, the location of the sample is not important as it will be acceptably in focus across a range of positions. As the depth of field decreases however, the range of acceptable focus rapidly narrows. Thus, with a very large aperture lens (f<1), the depth of field can be as narrow as 2 mm (depth of field of a 17 mm f/0.95 lens focussing at 15 cm using a sensor consisting of 16 μm pixels). Therefore, using a large aperture lens to capture as much light as possible means the object distance must be very accurately known as the lens focus will need to be frequently adjusted.

In a conventional imaging system, the object distance can be determined by viewing a captured image and adjusting for best focus. This can be done automatically by, for example, taking the first spatial derivative of an image, adjusting the axial position of the lens, and then taking further images until a maximum in the derivative image is achieved. As discussed above, the typical integration time for a low light image is tens of seconds to hours, which means that it is not possible to determine the object distance in this way. Therefore, known methods of automatically focusing a lens are not suitable for low light imaging systems as described above.

Moreover, large aperture lenses also give rise to significant problems in altering the field of view. Altering the field of view (magnification) ensures that the region of interest of the sample fills as much of the field of view of the lens/camera as possible. The field of view of a camera system is determined by three parameters—the size of the imaging chip, the focal length of the imaging lens and the distance from the imaging lens to the object; wherein the focal length and distance from the imaging lens to the object determines the image magnification.

In a conventional imaging system, the field of view is readily varied by the movement of a series of imaging lenses which varies the focal length. The series of imaging lenses in combination are commonly known as a "zoom lens". As the aperture size increases in relation to the focal length of the lens, the number and size of lens elements increases to correct for, inter alia, spherical and chromatic aberrations. Consequently, the complexity of the zoom lens rises exponentially to the size of the aperture. Because of this requisite complexity, zoom lenses with very large apertures are not commercially available/viable.

In the absence of a zoom lens, the field of view can be varied by cycling through a series of lenses with set focal lengths (i.e. a turret lens system). For similar reasons as to the absence of low f-number zoom lenses, the commercial availability of low f-number fixed lenses with different focal lengths is also very limited. With the shallow depth of field required for optimal light collection, the number of lenses required for a turret system is unfeasibly large, notwithstanding the fact that the variety of lenses are not currently commercially available.

One way of avoiding the need for complex lens systems is to vary the distance between the sample and the high sensitivity camera, i.e. the object distance, and re-focussing the lens for the new object position. There exist a number of significant technical problems associated with varying the object distance and refocusing a high sensitivity camera in a low light clinical/surgical environment.

While in conventional imaging systems the object and the camera can easily be moved, high-sensitivity imaging systems deployed in clinical or surgical environments pose particular problems in this regard, as users typically do not have time to make such adjustments. Moreover, even if the object distance can been adjusted, the problem remains of how to quickly re-focus the high sensitivity camera in a low light environment, when the time needed to take a single image is tens of seconds to hours.

SUMMARY OF THE INVENTION

In order to overcome the problems associated with the prior art, the present invention provides an apparatus for optical imaging of a low radiance object, the apparatus comprises: a fixed polychromatic imaging device, the optical path between the polychromatic imaging device and the low radiance object being defined by a first section extending from the polychromatic imaging device to a fixed point, and a second section extending from the fixed point to the low radiance object; a fixed high-sensitivity imaging device, the optical path between the high-sensitivity imaging device and the low radiance object being defined by a third section extending from the high-sensitivity imaging device to the fixed point, and the second section; and a focus controller arranged to control the focus of the high-sensitivity imaging device based on the focus of the polychromatic imaging device and the respective lengths of the first and third sections.

Preferably, the focus controller comprises: a first motor for focussing the polychromatic imaging device; and a second motor for focussing the high-sensitivity imaging device.

Preferably, the polychromatic imaging device includes a first focusing lens and the high-sensitivity imaging device includes a second focusing lens, and wherein the first and second motors are arranged to move the axial positions of the first focusing lens and the second focusing lens, respectively, along the optical path.

Preferably, the focus controller comprises input means for receiving focus information from the polychromatic imaging device and the high-sensitivity imaging device.

Preferably, the focus information is generated by encoders arranged to track the focus of the polychromatic imaging device and the high-sensitivity imaging device. Preferably, the encoders are absolute encoders.

Preferably, the fixed point is defined by the position of a reflex mirror arranged to direct light towards the polychromatic imaging device when in a first position, and towards the high-sensitivity imaging device when in a second position.

Preferably, the first position is a rest or default position, and the second position is sprung or active position.

Preferably, when in the first positions, the reflex mirror forms a light-tight seal preventing light from reaching the high-sensitivity imaging device, and most preferably, the light-tight seal comprises a labyrinth seal.

Preferably, the high-sensitivity imaging device is a Charge-Coupled Device (CCD) camera and, most preferably, the high-sensitivity imaging device is an Electron Multiplying Charge-Coupled Device (emCCD) camera.

Preferably, the polychromatic imaging device is a high resolution Complementary Metal Oxide Semiconductor (CMOS) or Charge-Coupled Device (CCD) camera.

Preferably, the apparatus further comprises a first light-tight enclosure for housing the low-radiance object, and a second light tight enclosure for housing the polychromatic imaging device and the high-sensitivity imaging device, and most preferably, comprises a radiation shield arranged to shield the high-sensitivity imaging device from gamma particles and charged particles emitted from the low-radiance object.

The focus controller can be arranged to control the focus of the high-sensitivity imaging device by using an axial position value of the first focusing lens and a look-up table. Alternatively, the focus controller can be arranged to control the focus of the high-sensitivity imaging device using an axial position value of the first focusing lens of the polychromatic imaging device and the lengths of the first section and the third section.

Preferably, the apparatus further comprises an optical system arranged to vary the length of the second section.

The present invention also provides a method of focussing the high-sensitivity imaging device of the apparatus, the method comprises the steps of: receiving the axial position value of the first focusing lens; determining, using a look-up table (LUT), a required axial position of the second focusing lens based on the axial position of the first focusing lens; and moving the second focusing lens to the determined axial position. Alternatively, the method comprises the steps of: receiving the axial position value of the first focusing lens; calculating a required axial position of the second focusing lens based on the axial position of the first focusing lens and the length of the first and third segments; and moving the second focusing lens to the calculated axial position.

The present invention also provide a computer program product for a data-processing device, the computer program product comprising a set of instructions which, when loaded into the data-processing device, causes the device to perform the above steps.

The present invention also provides an apparatus for optical imaging of a low radiance object, the apparatus comprising: a fixed polychromatic imaging device, the optical path between the polychromatic imaging device and the low radiance object being defined by a first section extending from the polychromatic imaging device to a fixed point, and a second section extending from the fixed point to the low radiance object; a fixed high-sensitivity imaging device, the optical path between the high-sensitivity imaging device and the low radiance object being defined by a third section extending from the high-sensitivity imaging device to the fixed point, and the second section and; and an optical system arranged to vary the length of the second section.

Preferably, the apparatus further comprises a sample holder for holding the low radiance object.

The sample holder may be fixed with respect to the polychromatic imaging device and the high-sensitivity imaging device. Preferably, the optical system comprises a pair of translatable mirrors disposed at right angles with respect to each other. Preferably, the position of the optical system is tracked by an encoder.

Alternatively, the sample holder can be movable with respect to the polychromatic imaging device and the high-sensitivity imaging device. Preferably, the optical system comprises a rotatable and translatable single mirror.

Preferably, the apparatus further comprises a focus controller arranged to control the focus of the high-sensitivity imaging device based on the focus of the polychromatic imaging device, the respective lengths of the first and third sections and the position of the optical system.

BRIEF DESCRIPTION OF THE DRAWINGS

The drawings will now be described, by way of example only, and with reference to the accompanying drawings, in which.

DESCRIPTION OF EMBODIMENTS OF THE INVENTION

Figure 1:
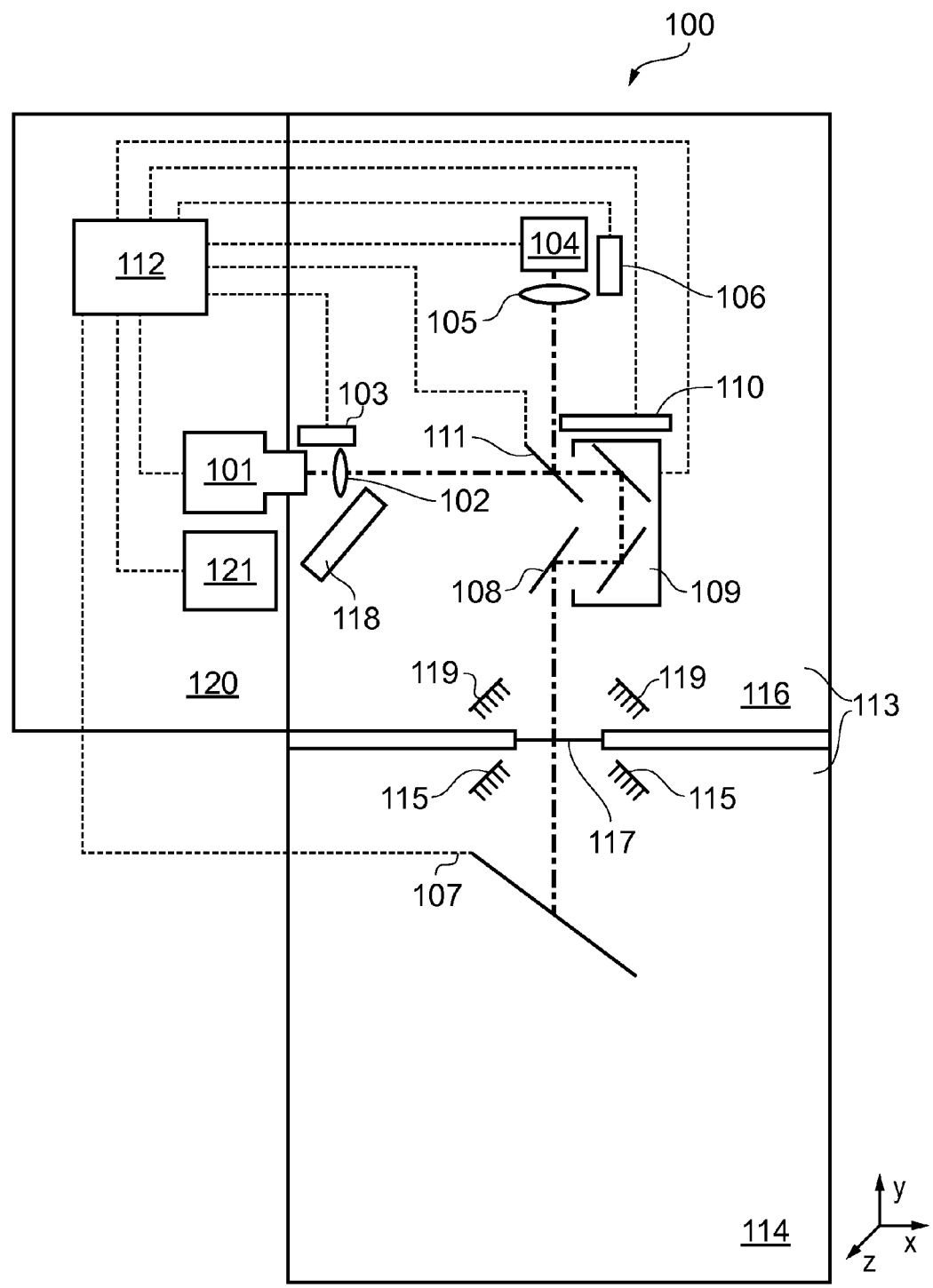
FIG. 1 shows a schematic diagram of an optical imaging system in accordance with an embodiment of the present invention.

A first embodiment of the invention will now be described with reference to FIG. 1. FIG. 1 shows an optical imaging system 100. The optical imaging system 100 has a high sensitivity camera 101. The high sensitivity camera 101 is preferably an electron multiplying charge-coupled device (emCCD). A lens 102 is arranged to direct light onto the high sensitivity camera 101. The lens 102 has a motor-driven focus, so that it can be focused by a control unit 112. Preferably, the lens 102 has a large aperture size (less than f/#=1). An encoder 103 is linked to the lens 102, so that its position may be known. The encoder 103 is preferably an absolute encoder.

The imaging system 100 also has a high resolution camera 104. The high resolution camera 104 is preferably a CMOS or a CCD camera. A second lens 105 is arranged to direct light onto the high resolution camera 104. The second lens 105 has a motor-driven focus, so that it can be focused by a control unit 112. A second encoder 106 is linked to the second lens 105, so that its position may be known. The second encoder 106 is preferably an absolute encoder.

The imaging system 100 has a sample holder 107. The sample holder 107 is adapted to hold a variety of shapes/sizes of objects to be imaged. The sample holder 107 may support surgical samples, small animals or any other object of interest. The sample holder 107 may be temperature controlled to assist in vivo experimentation.

The sample holder 107 is held in a fixed position relative to the optical imaging system 100. Light emitted from a sample in the sample holder 107 travels towards a first optical system 108. Preferably, the first optical system 108 is a fixed mirror.

Incident light is redirected from the first optical system 108 towards a second optical system 109. The second optical system 109 is translatable with respect to the optical path (i.e. along the x axis of FIG. 1), which allows the optical path to be extended or shortened. The second optical system 109 is preferably motor driven. A third encoder 110 is linked to the second optical system 109, so that its position may be known. The third encoder 110 is preferably an absolute encoder. The second optical system 109 may be any optical arrangement suitable to redirect light from the first optical system 108 onto a third optical system 111.

In a preferred embodiment, the first optical system 108 comprises a mirror arranged to divert light towards the second optical system 109. In yet a more preferred embodiment, the second optical system 109 comprises a pair of mirrors disposed at right angles. As can be seen from FIG. 1, movement of the second optical system 109 along the optical path (i.e. along the x axis) by X units of distance will adjust the optical path between the sample holder 107 and the third optical system 111 by a distance of 2X units.

Light is then directed from the second optical system 109 towards a third optical system 111. The third optical system 111 is positioned so that it can direct light towards the high sensitivity camera 101 in one position, and direct light towards the high resolution camera 104 in a second position. Preferably the third optical system 111 is a reflex mirror. More preferably, the third optical system 111 has a labyrinth seal (not shown) at one end arranged such that a light tight seal is formed around the high sensitivity camera 101 when in its rest state/default position.

The skilled reader will understand that the elements of the first 108, second 109 and third 111 optical systems may also be combined into a single sealed unit, or any combination thereof.

A control unit 112 is electrically linked to the high sensitivity camera 101, the first lens 102 and the first encoder 103. The control unit 112 is electrically linked to the high resolution camera 104, the second lens 105 and the second encoder 106. The control unit 112 is also electrically linked to sample holder 107, the second optical system 109, the third encoder 110 and the third optical system 111. In this way the control unit 112 is linked to all adjustable elements of the imaging system 100.

The control unit 112 may be a microprocessor/microcontroller, a dedicated computer/laptop, a chip or software run on an external personal computer.

The control unit 112 contains one or more inputs and one or more outputs. Preferably, the control unit 112 is linked to an external computer. The processing necessary for the control of the optical system 100 being performed as software running on the external computer. The control unit 112 is arranged to direct information from elements of the optical system 100 to the external computer and direct commands back from the external computer to elements of the optical system 100.

The imaging system 100 is contained within a light tight enclosure 113. There are many suitable methods for ensuring the enclosure is sufficiently light tight. Preferably each joint of the light tight enclosure 113 has a labyrinth seal. The interior of the light tight enclosure 113 may be coated in a low emissivity material. Some of these features are discussed further in International patent application publication number WO2014020360.

Preferably, the light tight enclosure is separated into two compartments. The sample holder 107 is contained within the first light tight compartment 114. The first light tight compartment 114 has a door (not shown) which allows for the addition or removal of an object into the sample holder 107. The first light tight compartment 114 may also have one or more ports in the compartment wall that allow access for a hand, instrument or gas flow line. The one or more ports are designed to prevent the transmission of light from the exterior of the first light tight compartment.

The first light tight compartment may contain one or more illumination sources 115. The illumination sources 115 allow for polychromatic imaging with the high resolution camera 104. Preferably the illumination sources 115 have very little residual phosphorescence once switched off More preferably, the one or more illumination sources 115 are light emitting diodes. The illumination sources 115 may however use any suitable light emitting technology.

The first light tight compartment 114 is designed to be easily cleaned and sterilised if necessary.

The first light tight compartment 114 and the second light tight compartment 116 share a wall. Light can pass between the first light tight compartment 114 and the second light tight compartment 116 through a window 117 in the shared wall. Preferably, the window 117 is made of an optically clear glass to aid light transmission. More preferably, the optically clear glass of window 117 also has anti-reflective coatings to reduce stray light reflections.

The second light tight compartment 116 contains elements of the imaging system 100 that are not accessed by a user during normal use. The second light tight compartment 116 may therefore enclose all of the optics and/or parts of the high sensitivity 101 and high resolution 104 cameras. One advantage of a second, sealed, light tight compartment 116 is that it does not require cleaning following normal use.

The second light tight enclosure 116 may contain radiation shielding 118. The radiation shielding 118 is placed to greatly reduce the incidence of gamma particles and charged particles incident upon the high sensitivity camera 101 when a radioactive sample is used. Charged particles incident on the high sensitivity camera may dramatically increase the level of noise recorded, which may obscure the image of the sample. The radiation shielding 118 could be lead, tungsten, Boron-filled high-density polyethylene or any other suitable material.

The second light tight enclosure 116 may also contain one or more illumination sources 119. The illumination sources 119 are directed through the window 117 to illuminate the sample holder 107. The illumination sources 119 allow for polychromatic imaging with the high resolution camera 104 whilst the first light tight compartment 114 is sealed. Preferably the illumination sources 119 have very little residual phosphorescence once switched off. More preferably, the one or more illumination sources 119 are light emitting diodes. The illumination sources 119 may however use any suitable light emitting technology.

The illumination sources 119 in the second light tight compartment 116 may operate in conjunction with the one or more light sources 115 in the first light tight compartment 114. Preferably, the illumination sources 119 are arranged so that the incident angle of light reaching the sample holder 107 is different to that of the light emitted from the illumination source 115. In this arrangement the optimal illumination source can be selected to reduce specular reflections from complex objects arriving at the imaging means. Additionally, the illumination sources 115 and 119 may be used consecutively to image respective reflection free parts of a sample. One of more of such images may be combined to remove specular reflections from the combined image.

A third compartment 120, which may not be light-tight, is included which contains elements of the optical system 100 that are not required to be kept in a light-tight environment. The third compartment 120 may contain cooling apparatus 121 arranged to reduce the temperature of the high sensitivity camera 101. Preferably, the cooling apparatus 121 is a thermoelectric (Peltier effect) cooler. The cooling apparatus 121 may alternatively make use of cryogenic liquids, such as nitrogen or helium.

The third compartment 120 may contain the control unit 112 in a fully contained unit, or connections to an external computer/control unit in some arrangements. The third compartment 120 may also contain parts of the imaging means 101 and 104 not required to be in a light-tight environment.

In this example embodiment, the process for taking an image of a low radiance object is as follows. A sample to be imaged is placed into the sample holder 107, the sample holder 107 placed into its fixed position within the first light tight compartment 114 and the door (not shown) of the first light tight compartment 114 closed to effect a light tight seal. The high resolution camera 104 is used to image the sample with the aid of one or both of the illumination sources 115 and 119 if necessary. The high resolution camera 104 may take multiple images per second to approximate video imaging.

Adjusting the region of interest enables an image to be taken using as much of the imaging chip as possible. The region of interest may be chosen manually by the user or may be performed automatically through the use of object recognition software. Since a suitable zoom lens or turret lens systems is unavailable for the high sensitivity camera 101, and it is preferable to fix the high sensitivity camera 101 and sample holder 107, the optical path must be adjusted to effect a change in the region of interest of the sample. The optical path may be adjusted by translation of the second optical system 109.

Having adjusted the optical pathway the high resolution camera 104 needs to be refocused. The image reaching the high resolution camera 104 is focused by adjustment of the second lens 105. This can be done automatically by, for example, taking the first spatial derivative of an image, adjusting the axial position of the lens, and then taking further images until a maximum in the derivative image is achieved. The skilled person will understand that any other generally known method of determining the best focus could be used. The new object distance can thus be determined by viewing a captured image and adjusting for best focus.

A high resolution image, or series of images, may then be captured and stored for later use. If required the sample holder may be further manipulated to enable images to be captured of different angles and/or different regions of interest.

One advantage of the above described optical arrangement is that both the sample holder 107 and the high sensitivity camera 101 can be kept fixed with respect to the optical pathway. A simpler sample holder 107 allows for a smaller first light tight enclosure 114 which is easier to keep light tight, clean and sterilised. Furthermore, this ensures that the high sensitivity camera is disturbed as little as possible and can always be ready for high sensitivity imaging.

Whilst the illumination sources 115 and/or 119 are in operation the high sensitivity camera 101 is protected from excess light by the light tight seal of the third optical system 111. In this way the high sensitivity camera 101 does not require thermal cycling and can be kept in its cold state.

The illumination sources 115 and/or 119 are then turned off to ensure that the light from the low luminosity sample is not swamped and the high sensitivity camera 101 is not damaged by excess light. The high sensitivity camera 101 will require refocusing if the optical pathway was altered by the movement of the second optical system 109. The large aperture size of the first lens 102 leads to a very shallow depth of field, thus even small adjustments of the second optical system 109 will require the first lens 102 to be adjusted.

Due to the long integration times required by the high sensitivity camera 101 to capture a single image, it is not feasible/possible to automatically focus the first lens 102 in the same manner as the second lens 105. However, due to the arrangement of the optical pathway described above, both of the imaging means share at least part of the optical path. The optical devices are arranged such that any alteration of the optical path by the second optical device 109 alters the object distance to the high sensitivity camera 101 and the high resolution camera 104 equally.

Furthermore, the depth of field of the second lens 105 is chosen to match that of the first lens 102. Therefore, as the Applicant has appreciated, if the relationship between the distance from the high sensitivity camera 101 to the third optical device 111 and the distance from the high resolution camera 104 to the third optical device 111 is known, then the high sensitivity camera 101 may be focused based on the settings of the high resolution camera 104.

Once the high resolution camera 104 has focused on the region of interest, the control unit 112 can measure the resultant axial position of the lens 105 from the encoder 106. The control unit 112 calculates the optimal axial position of the lens 102 which focuses the image incident on the high sensitivity camera 101.

The optimal axial position of the lens 102 may be calculated automatically using an algorithm based on the relative optical distances of the high sensitivity camera 101 and the high resolution camera 104 combined with the axial positions of the focal lenses 102 and 105. Alternatively, to reduce computational requirements, a look-up table for converting axial positions of one lens to another may be used. An example look-up table, suitable for use in the present invention, is provided below.

| Axial Position of High Resolution Camera Focal Lens (degrees) | Object Distance (millimetres) | Axial Position of High Sensitivity Camera Focal Lens (degrees) |
| --- | --- | --- |
| 0 | Infinity | 0 |
| 10 | 2275 | 13 |
| 20 | 1150 | 26 |
| 30 | 775 | 40 |
| 40 | 588 | 53 |
| 50 | 475 | 67 |
| 60 | 400 | 81 |
| 70 | 346 | 94 |
| 80 | 306 | 108 |
| 90 | 275 | 123 |
| 100 | 250 | 137 |
| 110 | 230 | 151 |
| 120 | 213 | 166 |
| 130 | 198 | 180 |
| 140 | 186 | 195 |
| 150 | 175 | 210 |
| 160 | 166 | 225 |
| 170 | 157 | 240 |
| 180 | 150 | 256 |
| 190 | 143 | 271 |
| 200 | 138 | 287 |
| 210 | 132 | 303 |
| 220 | 127 | 319 |
| 230 | 123 | 335 |
| 240 | 119 | 351 |
| 250 | 115 | 368 |
| 260 | 112 | 384 |
| 270 | 108 | 401 |
| 280 | 105 | 418 |
| 290 | 103 | 435 |
| 300 | 100 | 452 |
| 310 | 98 | 470 |
| 320 | 95 | 487 |
| 330 | 93 | 505 |
| 340 | 91 | 523 |
| 350 | 89 | 542 |

Accordingly, lens 102 can be adjusted to ensure the sample is in focus for the high sensitivity camera 101. The high sensitivity camera 101 then takes an image of the low luminosity sample. This second low luminosity image may then be combined with the polychromatic image to form a composite image which indicated the source of the low luminosity light within the sample.

One advantage of the present invention is that the high sensitivity camera 101 can be rapidly focused without needing to be exposed to any light source; in effect allowing high sensitivity camera 101 to be focused in complete darkness. This allows the high sensitivity camera 101 to remain in a cooled, light tight environment until imaging is to commence. This arrangement greatly reduces the thermal noise which in turn greatly increases the signal to noise ratio of any resultant image.

A further advantage of the present invention is that the time required to focus the high sensitivity camera 101 is now dependent on the focus time of the high resolution camera 104. This reduces the set-up time of the optical imaging system 100 from tens of minutes to tens of seconds. Such a significant improvement in the set-up time allows for a low luminosity imaging system that is useful across a wider range of applications, providing an economic advantage in the use of the device in many such applications.

When the optical imaging system 100 disclosed herein is applied to image the Cerenkov Luminescence emitted from radiopharmaceuticals passing through human tissue, it becomes possible to quickly detect and localise a wide variety of diseases. The arrangement disclosed in the first embodiment of this invention is perfectly suited for use in a clinical environment. With the significant decrease in imaging time the present invention enables, the optical imaging system 100 is quick enough to provide a clinician with information about the location and extent of a disease whilst still operating. This has the potential to alter how many operations are performed worldwide.

In the embodiment described above, imaging of the sample occurs sequentially. One of the advantages of the present invention is that the light can be quickly directed between the high sensitivity camera 101 and the high resolution camera 104. High resolution images taken with the aid of one or more illumination sources can be taken. Therefore, it is also possible to image the sample nearly concurrently with each camera.

In the above described embodiment the depth of field of the second lens 105 is matched to the first lens 101. It may be preferable, in some scenarios, for the second lens 105 to have an adjustable depth of field or a different depth of field to the first lens 102. In this further arrangement, a focal position of the first lens 102 based purely on the focal position of the second lens 105 may fall outside of acceptable focus. For small differences in depth of field, the lower resolution requirements of the high sensitivity camera 101 may mean no further adjustment is necessary. However, when the difference in depth of field allows for images taken by the high sensitivity camera 101 to be unsatisfactorily out of focus, further methods of estimating the object distance must be used.

The object distance can further be estimated by the reading of an accurate encoder 110 on the second optical device 109. In situations where the sample is largely flat/uniform, i.e. where it has been prepared by fixation and subsequent microtoming, the encoder 110 position alone will be sufficient to estimate the focal position of the first lens 102. If the sample is not flat/uniform a further active distance measurement device may be required. This device may be a laser range finder, a radar range finder or any other suitable range finding device. Object distance measurements from this device may then be used, in conjunction with the encoder data if necessary, to estimate the focal position of the first lens 102.

In the first embodiment, the axial position of the first lens/focal point of the high sensitivity camera 101 is determined by comparison with the axial position of the second lens/focal point of the high resolution camera 104. Alternatively, it is possible to determine the focal point of the first lens 102 by estimating the object distance as described above.

Figure 2:
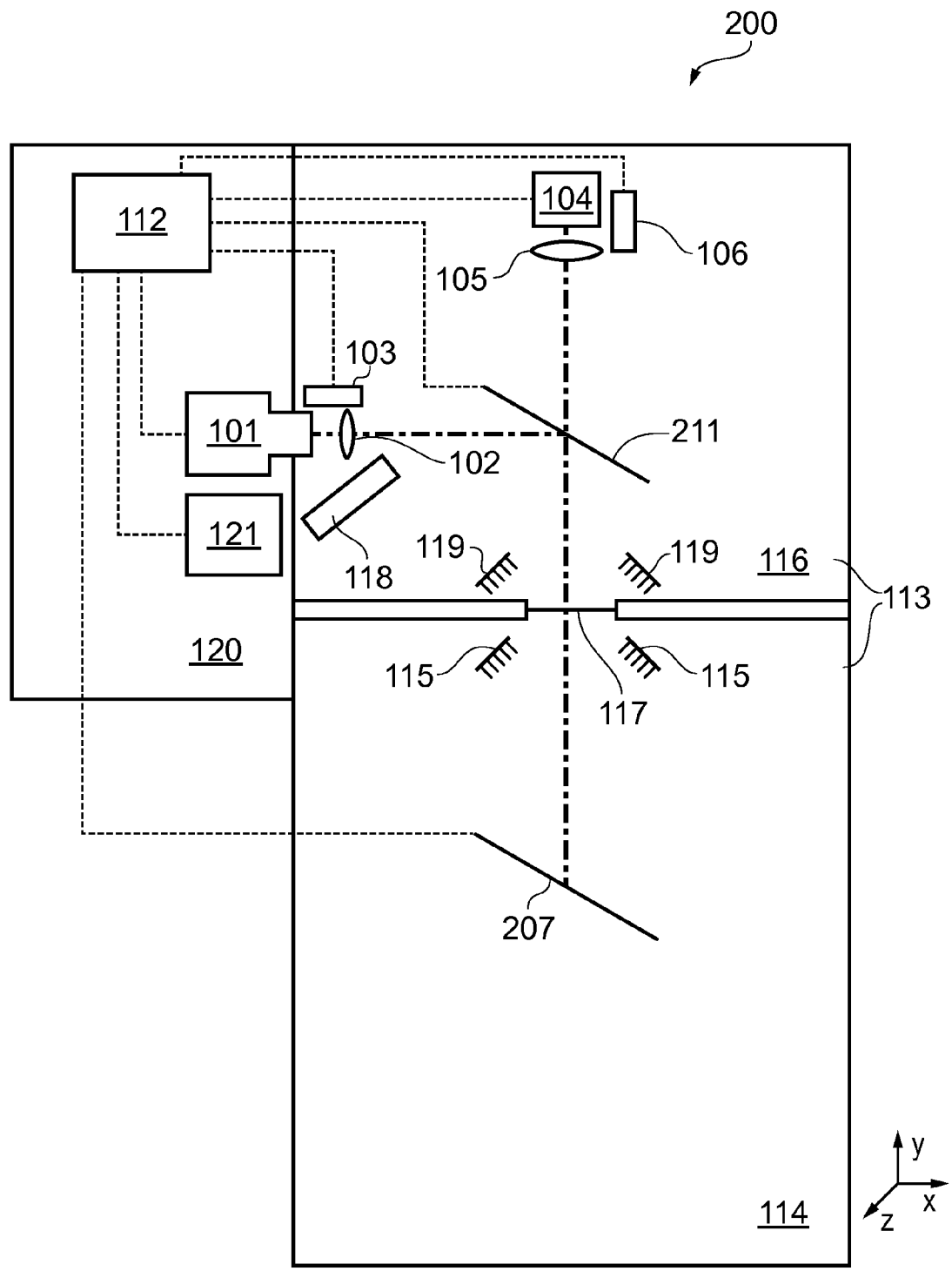
FIG. 2 shows a schematic diagram of an optical imaging system in accordance with another embodiment of the present invention.

FIG. 2 shows a further embodiment of the present invention, in which the optical imaging system 200 does not include the first 108 or second 109 optical systems. In this embodiment the sample holder 207 is not fixed. Instead, the sample holder 207 has one or more degrees of translational freedom, i.e. along the x, y and z axes in FIG. 2, and/or rotational freedom. The sample holder 207 is preferably motor driven. Preferably, the sample holder 207 may translate along the optical axis. The optical pathway is then adjusted, at least in part, by translation of the sample holder 207 along the optical axis.

The sample holder 207 may also translate and rotate in a plane perpendicular to the optical axis. The sample holder 207 may rotate around an axis, orthogonal to the optical axis, to present different views of the sample to the imaging system 200. Additionally, the sample holder 207 may translate in a plane orthogonal to the optical axis, to move different parts of the sample into the field of view of the imaging system 200.

Light is then directed from the sample holder 207 towards optical system 211. The optical system 211 is positioned so that it can direct light towards the high sensitivity camera 101 in one position, and direct light towards the high resolution camera 104 in a second position. Preferably the optical system 211 is a reflex mirror. More preferably, the optical system 211 has a labyrinth seal (not shown) at one end arranged such that a light tight seal is formed around the high sensitivity camera 101 when in its rest or default position. In the sprung or activated position (shown in FIG. 2), the optical system 211 directs light towards the high sensitivity camera 101.

One advantage of this arrangement is that the number and complexity of the optical elements is considerably reduced. Another advantage is that the cumulative loss of light, caused by reflections in the first and second optical systems 108 and 109 is reduced. This arrangement also means that a wider selection of optical elements may be used for the same device size. When imaging non-biological samples, the arrangement of the previous embodiment which allows for ease of cleaning/sterilisation is not necessary.

However, this embodiment requires a larger first light tight compartment 114 which in turn makes achieving an effective light-tight seal more difficult. Additionally, the sample holder 107 needs to be considerably more complex to accommodate the greater degrees of freedom.

In the first described embodiment, the control unit 112 passes information between the optical system 100 and an external computer. In a further embodiment, the control unit 112 may also perform all of the processing necessary for the function of the optical system 100 itself.

In this example embodiment, the process for taking an image of a low radiance object is as follows. A sample to be imaged is placed into the sample holder 207, the sample holder 207 placed at a given position within the first light tight compartment 114 and the door (not shown) of the first light tight compartment 114 closed to effect a light tight seal. The high resolution camera 104 is used to image the sample with the aid of one or both of the illumination sources 115 and 119 if necessary. The high resolution camera 104 may take multiple images per second to approximate video imaging. In the embodiment of FIG. 2, the optical pathway from the sample holder 207 is adjusted by moving the sample holder itself.

Having adjusted the optical pathway, the high resolution camera 104 needs to be refocused. The image reaching the high resolution camera 104 is focused by adjustment of the second lens 105. This can be done automatically by, for example, taking the first spatial derivative of an image, adjusting the axial position of the lens, and then taking further images until a maximum in the derivative image is achieved. The skilled person will understand that any other generally known method of determining the best focus could be used. The new object distance can thus be determined by viewing a captured image and adjusting for best focus.

A high resolution image, or series of images, may then be captured and stored for later use. If required the sample holder may be further manipulated to enable images to be captured of different angles and/or different regions of interest.

Whilst the illumination sources 115 and/or 119 are in operation the high sensitivity camera 101 is protected from excess light by the light tight seal of the optical system 211. In this way the high sensitivity camera 101 does not require thermal cycling and can be kept in its cold state.

The illumination sources 115 and/or 119 are then turned off to ensure that the light from the low luminosity sample is not swamped and the high sensitivity camera 101 is not damaged by excess light. The high sensitivity camera 101 will require refocusing if the optical pathway was altered by the movement of the sample holder 207.

Due to the long integration times required by the high sensitivity camera 101 to capture a single image, it is not feasible/possible to automatically focus the first lens 102 in the same manner as the second lens 105. However, due to the arrangement of the optical pathway described above, and shown in FIG. 2, both of the imaging means share at least part of the optical path, i.e. the path between the optical system 211 and the sample holder 207. The optical devices of the embodiment of FIG. 2 are arranged such that any alteration of the optical path by movement of the sample holder 207 alters the object distance to the high sensitivity camera 101 and the high resolution camera 104 equally.

Furthermore, the depth of field of the second lens 105 is chosen to match that of the first lens 102. Therefore, as the Applicant has appreciated, if the relationship between the distance from the high sensitivity camera 101 to the optical device 211 and the distance from the high resolution camera 104 to the optical device 211 is known, then the high sensitivity camera 101 may be focused based on the settings of the high resolution camera 104.

Once the high resolution camera 104 has focused on the region of interest, the control unit 112 can measure the resultant axial position of the lens 105 from the encoder 106. The control unit 112 calculates the optimal axial position of the lens 102 which focuses the image incident on the high sensitivity camera 101.

The optimal axial position of the lens 102 may be calculated or looked up in the same or in a similar manner to the method disclosed above with respect to FIG. 1.

Figure 3:
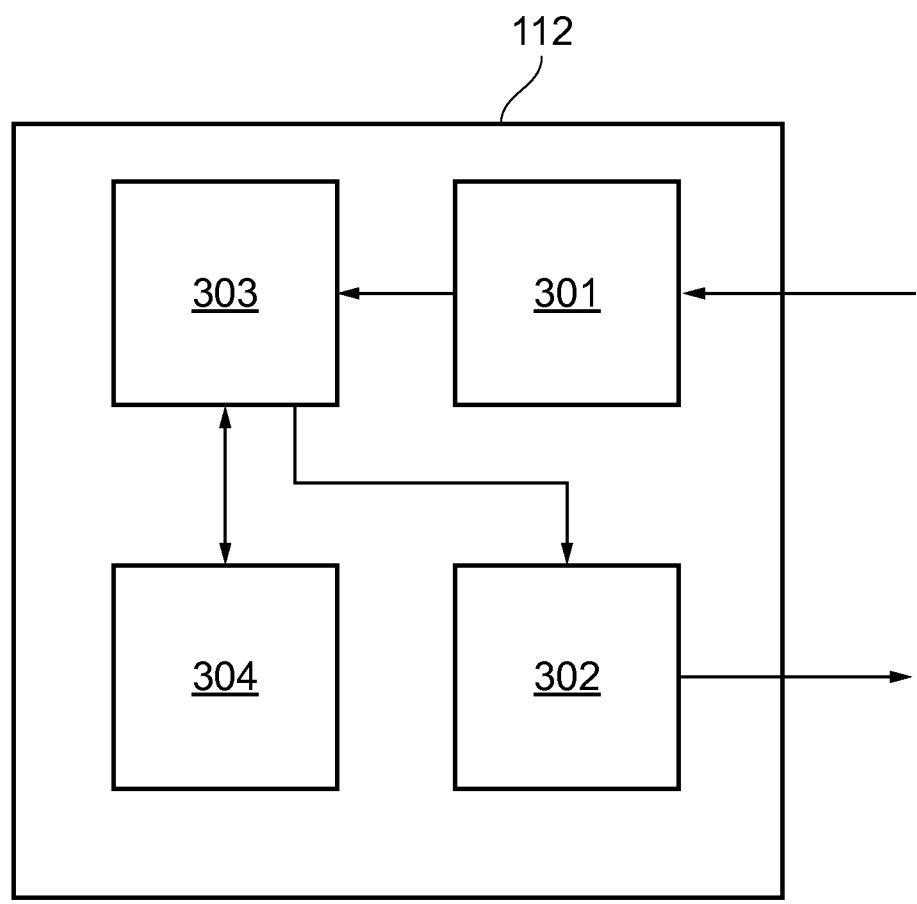
FIG. 3 shows a functional block diagram of a control unit suitable for use with the present invention.

FIG. 3 shows a control unit 112 suitable for use in the present invention. The control unit 112 has an input 301 and an output 302. Preferably, the input 301 is capable of receiving data from both the optical systems 100 or 200, as well as user commands. The input 301 is arranged to receive many different types of information, which may include image information from one or more of the imaging means, positions of equipment from one or more encoders and user commands.

The output 302 is arranged to control all adjustable elements of the optical imaging system 100. The output 302 may also present an interface to the user displaying information about the optical system 100 and any images being recorded. This information may include, inter alia, the orientation of the sample holder, an image of a sample and the current parameters/positions of the optical imaging system 100.

The control unit 112 also has a processor 303 and a memory 304. The processor 303 is arranged to be in communication with the input 301, the output 302 and the memory 304. The memory 304 may be volatile, non-volatile or a combination of the two. Information received by the processor 303 may be stored in the memory, and/or used by the processor and/or output to an external device. The processor is further arranged to calculate the optimal axial position of the lens 102 which focuses the image incident on the high sensitivity camera 101 and then adjust the axial position via the output 302. The optimal axial position of the lens 102 may be calculated automatically using an algorithm based on the relative optical distances and axial positions of the focal lenses 102 and 105. Alternatively, a look-up table, for converting axial positions of one lens to another, may be used.

The control unit 112 may also control further functions not described in detail here, such as door interlocks, gas flow rates, sample holder temperature etc. The control unit 112 may additionally run the image acquisition and manipulation software.

Figure 4:
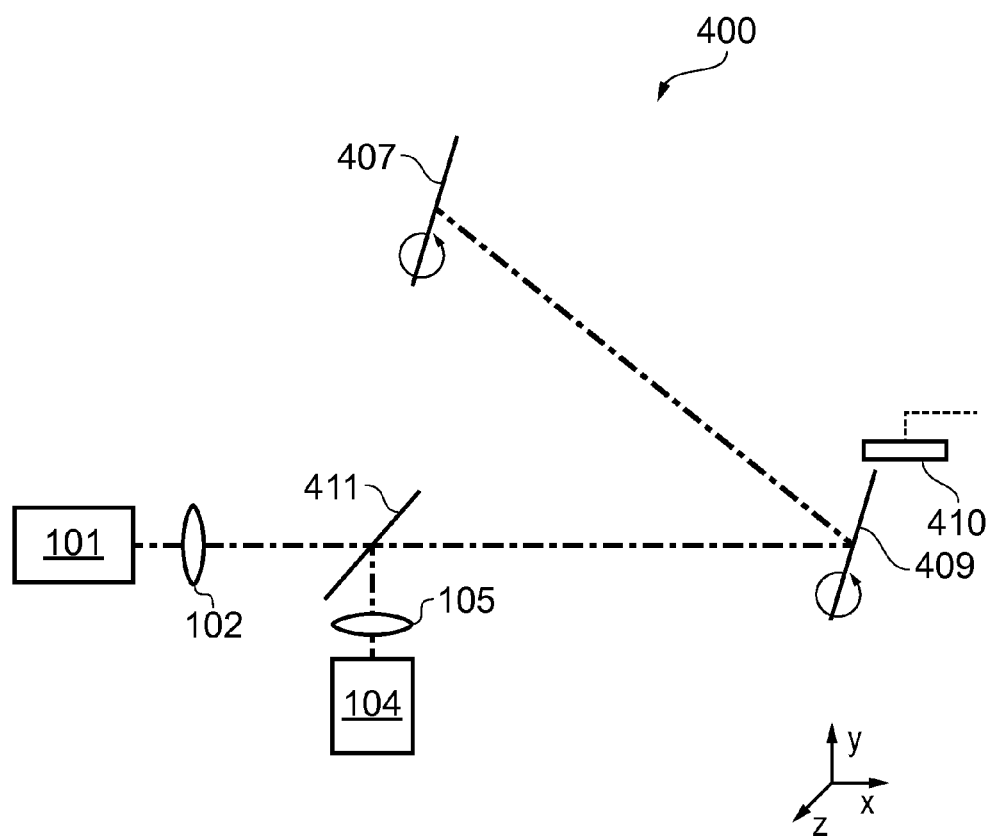
FIG. 4 shows a schematic diagram of elements of an optical imaging system in accordance with a further embodiment of the present invention.

FIG. 4 shows a further embodiment of the present invention. As will be appreciated, FIG. 4 only shows the elements which lie in the optical path of the system. The skilled person will understand that the same or similar features to those described with reference to FIGS. 1, 2 and 3, but not shown in FIG. 4, can be applied to the embodiment of FIG. 4, mutatis mutandis.

In this further embodiment, the optical imaging system 400 does not include the first optical system 108. The sample holder 407 and the optical system 409 can rotate about their respective centres. The optical pathway can be adjusted by the optical system 409 moving along the x axis. To ensure continued alignment of the optical imaging system 400, the angle of the sample holder 407 and the second optical system 409 must be adjusted to compensate for movement along the optical axis.

The required adjustment to the angle of the sample holder 407 and the second optical system 409 is predetermined by the position of the second optical system 409, which is tracked by the encoder 410.

One advantage of this further arrangement is that the number of required optical elements is further reduced, thereby lessening optical reflection losses.

One example of a suitable use for the present invention is in providing a surgeon with information about the extent of a disease quickly enough for the surgeon to make use of the information during the surgery. In this example a patient undergoing surgery will have a radiopharmaceutical, capable of preferably accumulating at the disease site, administered during or immediately prior to the operation commencing.

In the course of the operation the surgeon may want to know about the extent of the disease remaining/find the disease boundaries. To this end, the surgeon may remove a small sample of tissue for testing. The sample is placed directly onto a sample holder 107; 207; 407 which is placed into the optical imaging system 100; 200; 400. The door (not shown) to the light tight enclosure 114 is closed. The illumination sources 115 and/or 119 are turned on and the high resolution camera 104 starts taking images. The optical path is then adjusted in accordance with any of the methods described above. The second lens 105 is adjusted by the control unit 112 to bring the sample into acceptable focus. The first lens 102 is then automatically adjusted by the control unit 112, so that the high sensitivity camera 101 is kept in acceptable focus.

Polychromatic images may be taken of the sample by the high resolution camera, then the illumination sources 115 and/or 119 are turned off. The control unit 112 adjusts the optical elements 111, 211 or 411 so that light emitted by the sample is incident on the high sensitivity camera 101. The high sensitivity camera 101 can then record an image of the low luminosity sample. After a suitable integration time, the optical elements 111, 211 or 411 are adjusted back to its default position, shielding the high sensitivity camera from further light.

The surgeon can view the luminous image, the polychromatic image and/or an image of the two superimposed. In so doing the location and extent of the applied radiopharmaceutical within the sample can be discerned. Having discovered the presence (or not) and position of the disease within the sample, the surgeon may decide to take further images of the first sample, take images of further samples, remove further diseased material or be satisfied to the extent of the surgery.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within the scope of the attached claims.

The functions of the various elements shown in the Figures, including any functional blocks labeled as "processor" or "control unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "control unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

Similarly, any functional logical blocks shown in the Figures are conceptual only. Their function may be carried out through the operation of program logic, through dedicated logic, through the interaction of program control and dedicated logic. It should be appreciated by those skilled in the art that any block diagrams herein represent conceptual views of illustrative circuitry embodying the principles of the invention.

The invention claimed is:

1. An apparatus for optical imaging of a low radiance object, the apparatus comprising:
    an illumination source for illuminating the low radiance object;
    a fixed polychromatic imaging device for imaging the low radiance object when the low radiance object is illuminated, the optical path between the polychromatic imaging device and the low radiance object being defined by a first section extending from the polychromatic imaging device to a fixed point, and a second section extending from the fixed point to the low radiance object;
    a fixed high-sensitivity imaging device for imaging the low radiance object when the low radiance object is not illuminated by the illumination source, the optical path between the high-sensitivity imaging device and the low radiance object being defined by a third section extending from the high-sensitivity imaging device to the fixed point, and the second section; and
    a focus controller arranged to control the focus of the high-sensitivity imaging device to capture a focussed image of the low radiance object when the low radiance object is not illuminated, based on the focus of the polychromatic imaging device obtained by focussing the polychromatic imaging device on the low radiance object when the low radiance object is illuminated and the respective lengths of the first and third sections.

2. An apparatus in accordance with claim 1, wherein the focus controller comprises:
    a first motor for focussing the polychromatic imaging device; and
    a second motor for focussing the high-sensitivity imaging device.

3. An apparatus in accordance with claim 1, wherein the focus controller comprises input means for receiving focus information from the polychromatic imaging device and the high-sensitivity imaging device.

4. An apparatus in accordance with claim 1, wherein the fixed point is defined by the position of a reflex mirror arranged to direct light towards the polychromatic imaging device when in a first position, and towards the high-sensitivity imaging device when in a second position.

5. An apparatus in accordance with claim 1, wherein the high-sensitivity imaging device is a Charge-Coupled Device (CCD) camera.

6. An apparatus in accordance with claim 1, wherein the polychromatic imaging device is a high resolution Complementary Metal Oxide Semiconductor (CMOS) or Charge-Coupled Device (CCD) camera.

7. An apparatus in accordance with claim 1, further comprising a first light-tight enclosure for housing the low-radiance object, and a second light tight enclosure for housing the polychromatic imaging device and the high-sensitivity imaging device.

8. An apparatus in accordance with claim 1, wherein the apparatus further comprises:
    an optical system arranged to vary the length of the second section.

9. An apparatus in accordance with claim 2, wherein the polychromatic imaging device includes a first focusing lens and the high-sensitivity imaging device includes a second focusing lens, and wherein the first and second motors are arranged to move the axial positions of the first focusing lens and the second focusing lens, respectively, along the optical path.

10. An apparatus in accordance with claim 3, wherein the focus information is generated by encoders arranged to track the focus of the polychromatic imaging device and the high-sensitivity imaging device.

11. An apparatus in accordance with claim 10, wherein the encoders are absolute encoders.

12. An apparatus in accordance with claim 4, wherein the first position is a rest or default position, and the second position is sprung or active position.

13. An apparatus in accordance with claim 4, wherein, when in the first position, the reflex mirror forms a light-tight seal preventing light from reaching the high-sensitivity imaging device.

14. An apparatus in accordance with claim 13, wherein the light-tight seal comprises a labyrinth seal.

15. An apparatus in accordance with claim 5, wherein the high-sensitivity imaging device is an Electron Multiplying Charge-Coupled Device (emCCD) camera.

16. An apparatus in accordance with claim 7, further comprising a radiation shield arranged to shield the high-sensitivity imaging device from gamma particles and charged particles emitted from the low-radiance object.

17. An apparatus in accordance with claim 9, wherein the focus controller is arranged to control the focus of the high-sensitivity imaging device by using an axial position value of the first focusing lens and a look-up table.

18. An apparatus in accordance with claim 9, wherein the focus controller is arranged to control the focus of the high-sensitivity imaging device using an axial position value of the first focusing lens of the polychromatic imaging device and the lengths of the first section and the third section.

19. A method of focussing a high-sensitivity imaging device, the method comprising the steps of:
preparing an illumination source for illuminating the low radiance object;
preparing a fixed polychromatic imaging device for imaging the low radiance object when the low radiance object is illuminated, the optical path between the polychromatic imaging device and the low radiance object being defined by a first section extending from the polychromatic imaging device to a fixed point, and a second section extending from the fixed point to the low radiance object;
preparing a fixed high-sensitivity imaging device for imaging the low radiance object when the low radiance object is not illuminated by the illumination source, the optical path between the high-sensitivity imaging device and the low radiance object being defined by a third section extending from the high-sensitivity imaging device to the fixed point, and the second section; and
preparing a focus controller arranged to control the focus of the high-sensitivity imaging device to capture a focussed image of the low radiance object when the low radiance object is not illuminated, based on the focus of the polychromatic imaging device obtained by focussing the polychromatic imaging device on the low radiance object when the low radiance object is illuminated and the respective lengths of the first and third sections,
wherein the focus controller comprises a first motor for focussing the polychromatic imaging device, and a second motor for focussing the high-sensitivity imaging device;
and wherein the polychromatic imaging device includes a first focusing lens and the high-sensitivity imaging device includes a second focusing lens, and wherein the first and second motors are arranged to move the axial positions of the first focusing lens and the second focusing lens, respectively, along the optical path;
and wherein the focus controller is arranged to control the focus of the high-sensitivity imaging device by using an axial position value of the first focusing lens and a look-up table;
receiving the axial position value of the first focusing lens;
determining, using the look-up table (LUT), a required axial position of the second focusing lens based on the axial position of the first focusing lens; and
moving the second focusing lens to the determined axial position.

20. A method of focussing a high-sensitivity imaging device, the method comprising the steps of:
preparing an illumination source for illuminating the low radiance object;
preparing a fixed polychromatic imaging device for imaging the low radiance object when the low radiance object is illuminated, the optical path between the polychromatic imaging device and the low radiance object being defined by a first section extending from the polychromatic imaging device to a fixed point, and a second section extending from the fixed point to the low radiance object;
preparing a fixed high-sensitivity imaging device for imaging the low radiance object when the low radiance object is not illuminated by the illumination source, the optical path between the high-sensitivity imaging device and the low radiance object being defined by a third section extending from the high-sensitivity imaging device to the fixed point, and the second section; and
preparing a focus controller arranged to control the focus of the high-sensitivity imaging device to capture a focussed image of the low radiance object when the low radiance object is not illuminated, based on the focus of the polychromatic imaging device obtained by focussing the polychromatic imaging device on the low radiance object when the low radiance object is illuminated and the respective lengths of the first and third sections,
wherein the focus controller comprises a first motor for focussing the polychromatic imaging device, and a second motor for focussing the high-sensitivity imaging device;
and wherein the polychromatic imaging device includes a first focusing lens and the high-sensitivity imaging device includes a second focusing lens, and wherein the first and second motors are arranged to move the axial positions of the first focusing lens and the second focusing lens, respectively, along the optical path;
and wherein the focus controller is arranged to control the focus of the high-sensitivity imaging device using an axial position value of the first focusing lens of the polychromatic imaging device and the lengths of the first section and the third section;
receiving the axial position value of the first focusing lens;
calculating a required axial position of the second focusing lens based on the axial position of the first focusing lens and the length of the first and third segments; and
moving the second focusing lens to the calculated axial position.

21. A computer program product for a data-processing device, the computer program product comprising a set of instructions which, when loaded into the data-processing device, causes the device to perform the steps of a method of focussing a high-sensitivity imaging device, the method comprising:
preparing an illumination source for illuminating the low radiance object;
preparing a fixed polychromatic imaging device for imaging the low radiance object when the low radiance object is illuminated, the optical path between the polychromatic imaging device and the low radiance object being defined by a first section extending from the polychromatic imaging device to a fixed point, and a second section extending from the fixed point to the low radiance object;
preparing a fixed high-sensitivity imaging device for imaging the low radiance object when the low radiance object is not illuminated by the illumination source, the optical path between the high-sensitivity imaging device and the low radiance object being defined by a third section extending from the high-sensitivity imaging device to the fixed point, and the second section; and
preparing a focus controller arranged to control the focus of the high-sensitivity imaging device to capture a focussed image of the low radiance object when the low radiance object is not illuminated, based on the focus of the polychromatic imaging device obtained by focussing the polychromatic imaging device on the low radiance object when the low radiance object is illuminated and the respective lengths of the first and third sections, wherein the focus controller comprises a first motor for focussing the polychromatic imaging device, and a second motor for focussing the high-sensitivity imaging device;

and wherein the polychromatic imaging device includes a first focusing lens and the high-sensitivity imaging device includes a second focusing lens, and wherein the first and second motors are arranged to move the axial positions of the first focusing lens and the second focusing lens, respectively, along the optical path;

and wherein the focus controller is arranged to control the focus of the high-sensitivity imaging device using an axial position value of the first focusing lens of the polychromatic imaging device and the lengths of the first section and the third section;

receiving the axial position value of the first focusing lens;

calculating a required axial position of the second focusing lens based on the axial position of the first focusing lens and the length of the first and third segments; and moving the second focusing lens to the calculated axial position.

\* \* \* \* \*